US010948678B2

(12) United States Patent
Cooke et al.

(10) Patent No.: US 10,948,678 B2
(45) Date of Patent: *Mar. 16, 2021

(54) BI-DIRECTIONAL DATA CENTER ARCHITECTURES INCLUDING A JACKETLESS TRUNK CABLE AND METHODS OF FORMING THE SAME

(71) Applicant: CORNING OPTICAL COMMUNICATIONS LLC, Hickory, NC (US)

(72) Inventors: Terry Lee Cooke, Hickory, NC (US); Christopher Shawn Houser, Hickory, NC (US); Hanna Marciniak, Lodz (PL); Brian Keith Rhoney, Denver, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,746

(22) Filed: Aug. 1, 2019

(65) Prior Publication Data

US 2019/0353866 A1 Nov. 21, 2019

Related U.S. Application Data

(63) Continuation of application No. 15/522,034, filed as application No. PCT/US2015/057966 on Oct. 29, 2015, now Pat. No. 10,371,917.

(30) Foreign Application Priority Data

Nov. 5, 2014 (EP) ..................................... 14191842

(51) Int. Cl.
*G02B 6/44* (2006.01)

(52) U.S. Cl.
CPC ........... *G02B 6/4475* (2013.01); *G02B 6/441* (2013.01); *G02B 6/4452* (2013.01)

(58) Field of Classification Search
CPC .... G02B 6/4475; G02B 6/4452; G02B 6/441; G02B 6/24; G02B 6/3612; G02B 6/4219;
(Continued)

(56) References Cited

U.S. PATENT DOCUMENTS 5,655,036 A * 8/1997 Webb ..................... H04B 10/07
385/15
7,184,635 B2 2/2007 Livingston
(Continued)

FOREIGN PATENT DOCUMENTS

| EP | 2333597 A2 | 6/2011 |
| WO | 2011116081 A1 | 9/2011 |
| WO | 2012151231 A1 | 11/2012 |

OTHER PUBLICATIONS

European Search Report; EP14191842; dated Apr. 7, 2015; 7 Pages.
(Continued)

*Primary Examiner* — Akm E Ullah
(74) *Attorney, Agent, or Firm* — Adam R. Weeks

(57) ABSTRACT

Bi-directional data center architectures employing a jacketless trunk cable are disclosed. The bi-directional data center architecture includes first and second coupling panels respectively having first adapters and second adapters. The architecture also includes a plurality of sub-racks having sub-rack adapters, and a jacketless trunk cable that includes a plurality of sub-unit sections, with each sub-unit section carrying one or more optical fibers. The plurality of sub-unit sections are configured to optically connect corresponding first and second adapters of the first and second coupling (Continued)

panels to the sub-rack adapters such that every optical fiber in each sub-unit section is used to establish an optical connection.

16 Claims, 8 Drawing Sheets

(58) Field of Classification Search
CPC .. G02B 6/4246; G02B 6/4249; G02B 6/4473; G02B 6/4476
USPC .................................................. 385/24, 100
See application file for complete search history.

(56) References Cited

U.S. PATENT DOCUMENTS

| | | |
|---|---|---|
| 8,485,737 B2 | 7/2013 | Kolesar |
| 9,042,732 B2 * | 5/2015 | Cune ................ H04B 10/25753 398/96 |
| 9,448,365 B2 | 9/2016 | Fletcher |
| 2010/0322582 A1 * | 12/2010 | Cooke ................ G02B 6/4452 385/135 |
| 2011/0129186 A1 | 6/2011 | Lewallen et al. |
| 2011/0176779 A1 | 7/2011 | Kolesar |
| 2011/0188819 A1 * | 8/2011 | Keller ................ G02B 6/4494 385/103 |
| 2015/0331192 A1 | 11/2015 | Hall |
| 2016/0192044 A1 * | 6/2016 | Raza .................... G02B 6/3885 398/49 |
| 2018/0219635 A1 * | 8/2018 | Sipes, Jr. ............. G02B 6/3817 |

OTHER PUBLICATIONS

International Search Report and Written Opinion of the International Searching Authority; PCT/US15/57966; dated May 17, 2016.

* cited by examiner

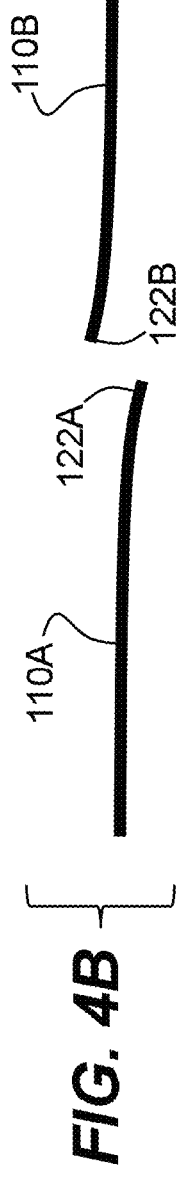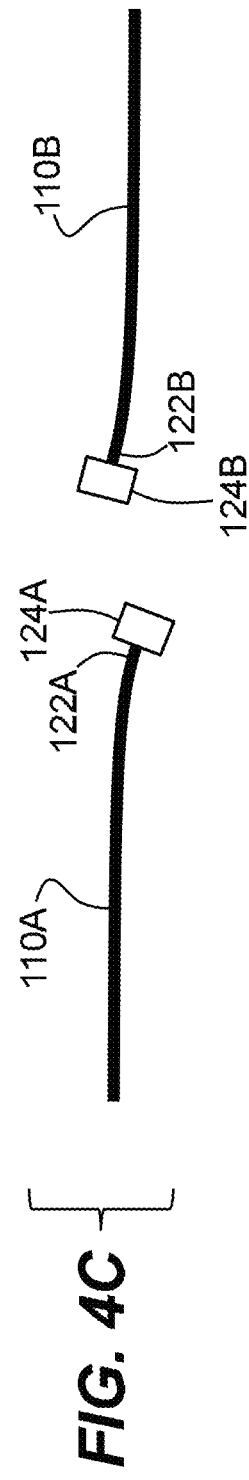

BI-DIRECTIONAL DATA CENTER ARCHITECTURES INCLUDING A JACKETLESS TRUNK CABLE AND METHODS OF FORMING THE SAME

PRIORITY APPLICATION

This application is a continuation of U.S. application Ser. No. 15/522,034, filed on Oct. 29, 2015, which is a national stage application under 35 U.S.C. § 371 of International Application No. PCT/US15/57966, which claims the benefit of priority of European Patent Application Serial No. 14191842.5, filed on Nov. 5, 2014. The content of each of these applications is relied upon and incorporated herein by reference in entirety.

FIELD

The present disclosure relates to data center architectures, and in particular relates to bi-directional data center architectures employing a jacketless trunk cable.

BACKGROUND

A data center is a facility that houses interconnected (networked) computers and related support equipment for the purpose of remotely receiving, processing, storing and distributing large amounts of data. The network has a structure or configuration (referred to in the art as an "architecture") that allows the various computers to communicate and share data through an array of optical fiber cables, routers and switches.

FIG. 1 is a schematic diagram of an example data center 10 that has a conventional architecture. The data center 10 includes first and second coupling panels 20A and 20B with respective front sides 21A and 21B and respective back sides 22A and 22B. Coupling panels 20A and 20B respectively includes front-side adapters 24A, 24B and back-side adapters 26A, 26B. The data center 10 also includes by way of example four sub-racks 30-1, 30-2, 30-3 and 30-4 that support switches, routers, storage devices, servers, etc. with each sub-rack having adapters 32A and 32B.

Data center 10 utilizes first and second optical fiber trunk cables or "trunks" 40A and 40B that each carries a large number of optical fibers. Groups of fibers called "legs" 42A and 42B respectively branch off from trunks 40A and 40B to connect to connector locations or adapters 26A and 26B on the respective back sides 22A and 22B of the first and second coupling panels 20A and 20B. Individual jumper cables 50A (solid lines) and 50B (dashed lines) connect the respective front-end adapters 24A and 24B of coupling panels 20A and 20B and to the adapters 32A and 32B of the individual sub-racks 30-1, 30-2, 30-3 and 30-4, as shown. The connection of each sub-rack 30 to both of the coupling panels 20A and 20B is made for redundancy.

The use of individual jumper cables 50A and 50B in the conventional data center 10 of FIG. 1 results in cable congestion, is time consuming, labor-intensive and complicated to set up and maintain, and also adds to heating and space requirements of the data center.

Since modern-day data centers can be enormous, consume tremendous amounts of power, and increasingly rely on complicated cabling solutions, there is renewed interest in streamlining the data center architecture to optimize space usage, to reduce energy (cooling) costs, and reduce the cabling complexity.

SUMMARY

One aspect of the disclosure is a bi-directional data center architecture that includes: first and second trunk cables; first and second coupling panels respectively operably connected to the first and second trunk cables, the first and second coupling panels respectively having first adapters and second adapters; a plurality of sub-racks having sub-rack adapters; a jacketless trunk cable that includes a plurality of sub-units, with each sub-unit carrying one or more optical fibers; and wherein the plurality of sub-units are configured to optically connect corresponding first and second adapters of the first and second coupling panels to the sub-rack adapters such that every optical fiber in each sub-unit is used to establish an optical connection.

Another aspect of the disclosure is a method of forming a bi-directional data center architecture that includes a plurality of sub-racks. The method includes: operably connecting first and second trunk cables to respective first and second coupling panels, wherein the first and second coupling panels respectively have first adapters and second adapters; providing a jacketless trunk cable that includes a plurality of sub-units, with each sub-unit carrying one or more optical fibers; and optically connecting the first and second adapters of the first and second coupling panels to the sub-rack adapters, such that every optical fiber in each sub-unit is used to establish an optical connection.

Another aspect of the disclosure is a bi-directional data center architecture that includes: first and second trunk cables; first and second coupling panels respectively operably connected to the first and second trunk cables, the first and second coupling panels respectively having N first adapters and N second adapters; a plurality of N sub-racks; a jacketless trunk cable that includes a plurality of N sub-units, with each sub-unit carrying one or more optical fibers, wherein each sub-unit includes first and second connectorized sections; and wherein the first and second connectorized sections of a given sub-unit respectively optically connect corresponding first and second adapters of the first and second coupling panels to the same sub-rack such that every optical fiber in each sub-unit is used to establish an optical connection.

Another aspect of the disclosure is a method of forming a bi-directional data center architecture that includes a plurality of N sub-racks. The method includes: operably connecting first and second trunk cables to respective first and second coupling panels, wherein the first and second coupling panels respectively have N first adapters and N second adapters; providing a jacketless trunk cable that includes a plurality of N sub-units, with each sub-unit carrying one or more optical fibers, wherein each sub-unit includes first and second connectorized sections; and optically connecting the first and second connectorized sections of a given sub-unit to corresponding ones of the first and second adapters of the first and second coupling panels and to first and second adapters of the same sub-rack, such that every optical fiber in each sub-unit is used to establish an optical connection.

Another aspect of the disclosure is a bi-directional data center architecture that includes: first and second trunk cables; first and second coupling panels respectively operably connected to the first and second trunk cables, the first and second coupling panels respectively having N first adapters and N second adapters; a plurality of N sub-racks; a jacketless trunk cable that includes a plurality of (N+1) sub-units each carrying one or more optical fibers, wherein (N−1) of the sub-units includes first and second connectorized sections while two of the sub-units are first and second peripheral sub-units that each consists of a single section; wherein the first and second connectorized sections of a given one of the (N−1) sub-units respectively optically connect corresponding first and second adapters of the first and second coupling panels to different sub-racks; and wherein the first peripheral sub-unit is optically connected to a peripheral one of the N first adapters and to a most distant one of the sub-racks as measured from the first coupling panel, and the second peripheral sub-unit is optically connected to a peripheral one of the N second adapters and to a most distant one of the sub-racks as measured from the second coupling panel; and wherein every optical fiber in each sub-unit is used to establish an optical connection.

Another aspect of the disclosure is a method of forming a bi-directional data center architecture that includes a plurality of N sub-racks. The method includes: operably connecting first and second trunk cables to respective first and second coupling panels, wherein the first and second coupling panels respectively have N first and second adapters; providing a jacketless trunk cable that includes a plurality of (N+1) sub-units each carrying one or more optical fibers, wherein (N−1) of the sub-units includes first and second connectorized sections, while two of the sub-units are peripheral sub-units that each consists of a single section; optically connecting first and second adapters of the first and second coupling panels to different sub-racks respectively using the first and second connectorized sections of a given one of the (N−1) sub-units; optically connecting the first peripheral sub-unit to a peripheral one of the N first adapters and to a most distant one of the sub-racks as measured from the first coupling panel; optically connecting the second peripheral sub-unit to a peripheral one of the N second adapters and to a most distant one of the sub-racks as measured from the second coupling panel; and wherein every optical fiber in each sub-unit is used to establish an optical connection.

Another aspect of the disclosure is bi-directional data center architecture, comprising: first and second trunk cables; first and second coupling panels respectively having N first adapters and N second adapters and respectively operably connected to the first and second trunk cables, wherein one of the N first adapters in the first coupling panel is optically connected to the second trunk cable and one of the N second adapters in the second coupling panel is optically connected to the first trunk cable; a plurality of N sub-racks; a jacketless trunk cable that includes a plurality of N sub-units each carrying one or more optical fibers, wherein each sub-unit includes first and second connectorized sections; and wherein the first and second connectorized sections of a given sub-unit respectively optically connect corresponding ones of the N first and N second adapters of the first and second coupling panels to a different sub-rack such that every optical fiber in each sub-unit is used to establish an optical connection.

Another aspect of the disclosure is a method of forming a bi-directional data center architecture that includes a plurality of N sub-racks. The method includes: operably connecting first and second trunk cables to respective first and second coupling panels, wherein the first and second coupling panels respectively have N first adapters and N second adapters, and including optically connecting one of the N first adapters in the first coupling panel to the second trunk cable and optically connecting one of the N second adapters in the second coupling panel to the first trunk cable; providing a jacketless trunk cable that includes a plurality of N sub-units, with each sub-unit carrying one or more optical fibers, and wherein each sub-unit includes first and second connectorized sections; and optically connecting the first and second connectorized sections of a given sub-unit to corresponding ones of the N first adapters and the N second adapters of the first and second coupling panels and to first and second adapters of a different sub-rack, such that every optical fiber in each sub-unit is used to establish an optical connection.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the Detailed Description serve to explain principles and operation of the various embodiments. As such, the disclosure will become more fully understood from the following Detailed Description, taken in conjunction with the accompanying Figures, in which:

FIG. 4A and FIG. 4B illustrate the furcation of one of the sub-units of the jacketless trunk cable to form corresponding sub-unit sections with respective cut ends;

FIG. 4C illustrates the connectorization of the cut ends of the two sub-unit sections of FIG. 4B;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

In the discussion below, the term "data center architecture" or simply "architecture" includes the data center components (e.g., switches, routers, storage devices, servers, etc.) and the optical interconnections made between the data center components.

Also in the discussion below, the number N is an integer equal to or greater than 1.

Figure 1:
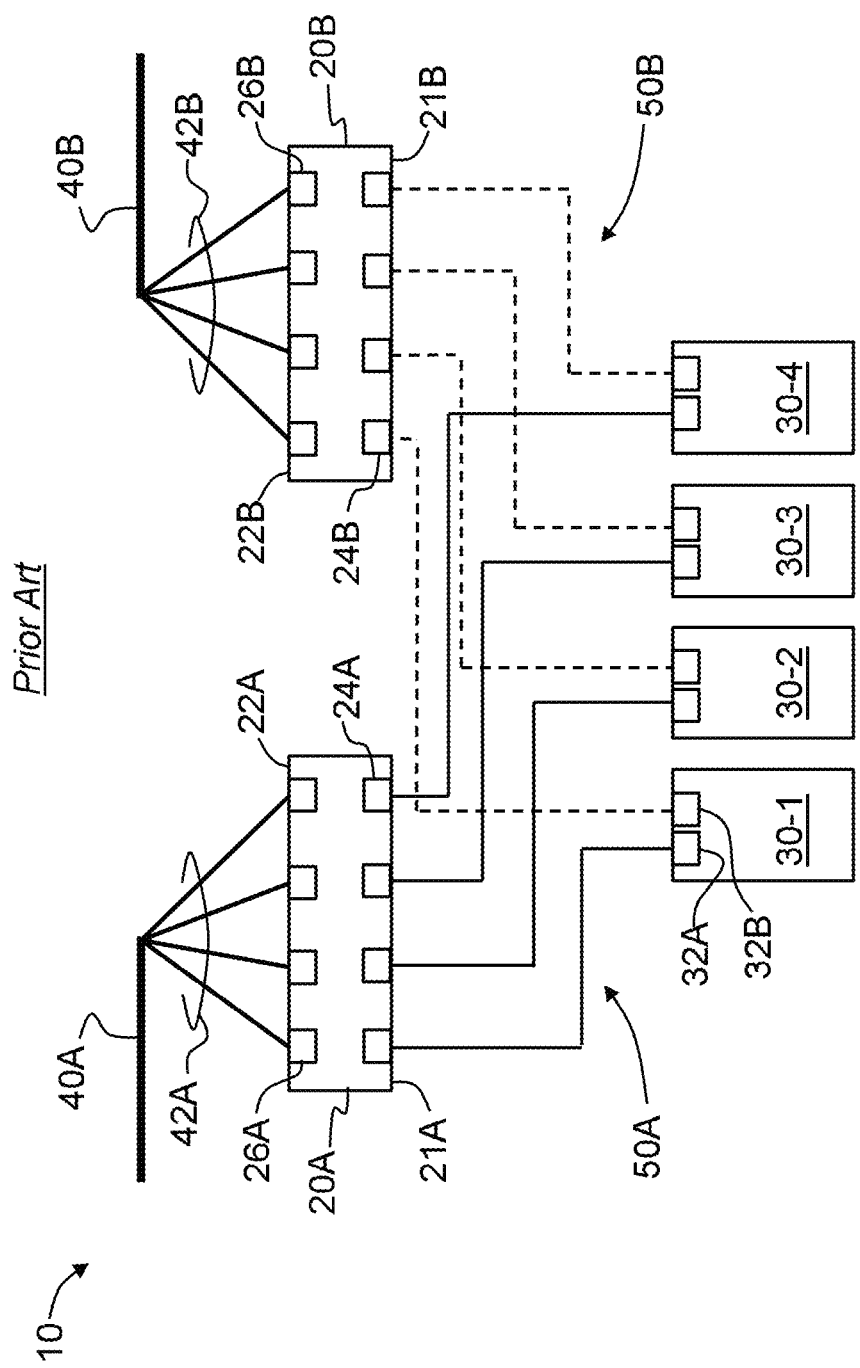
FIG. 1 is a schematic diagram of a prior art bi-directional data center illustrating the conventional use of individual jumper cables to connect individual sub-racks to coupling panels.
Figure 2A:
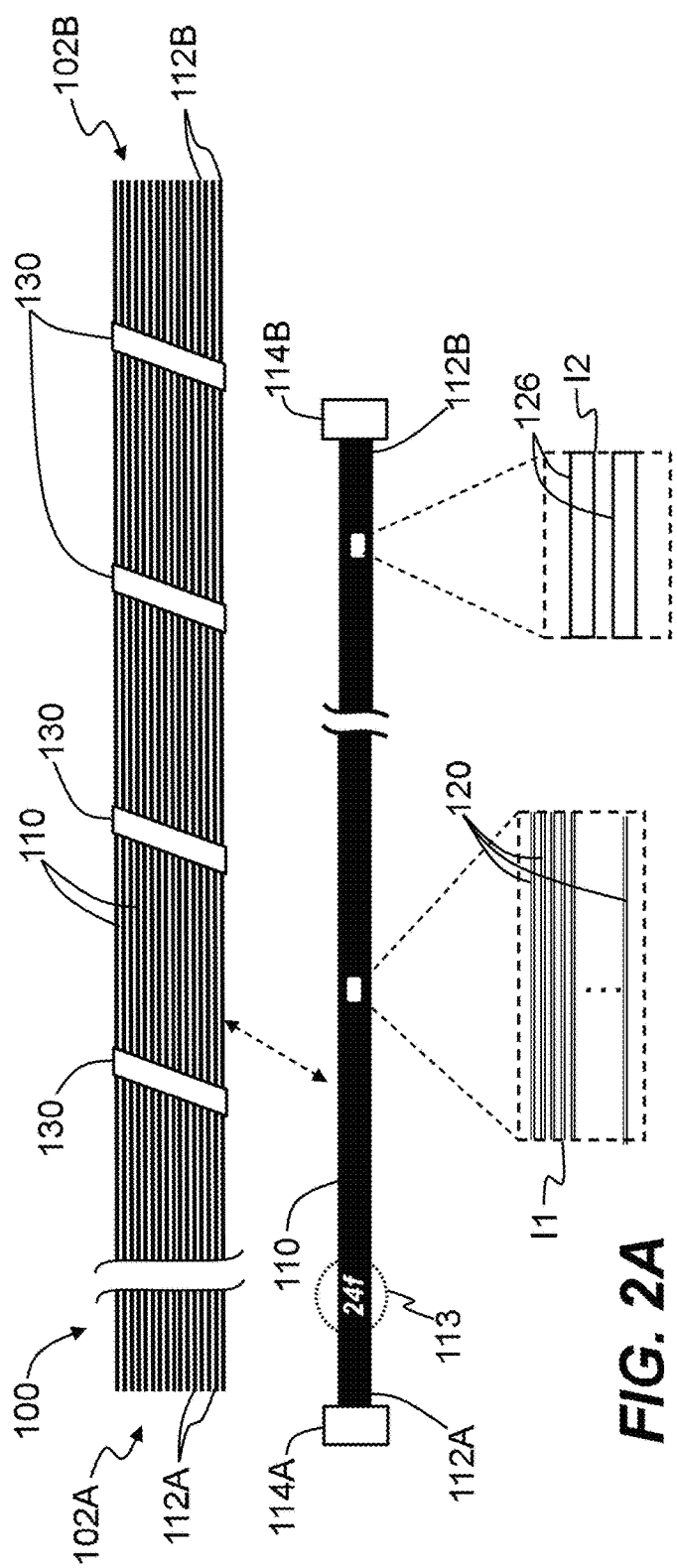
FIG. 2A is a close-up side view of an example jacketless trunk cable used to form the bi-directional data center architectures disclosed herein.

FIG. 2A is a close-up side view of an example jacketless trunk optical fiber cable ("jacketless trunk") 100 used to establish the optical connections between data center components, as described below. The jacketless trunk 100 has opposite ends 102A and 102B and includes a plurality N of stranded optical fiber cables or "sub-units" 110 that each carries one or more optical fibers 120, as shown in the cascaded close-up views. Each sub-unit 110 includes opposite ends 112A and 112B that respectively include optical fiber connectors ("connectors") 114A and 114B. In an example, connectors 114A and 114B are standard types of connectors used in the art, including multifiber connectors, such as MPO and MTP® connectors, and correspond to the number of optical fibers 120 carried in each sub-unit.

The sub-units 110 can be identified by the number of optical fibers 120 they carry, e.g., for 12 optical fibers, the sub-unit is a "12f" sub-unit. The sub-units 110 can carry any reasonable number of optical fibers 120, including as few as a single optical fiber (see first close-up inset I1 in FIG. 2A) In various examples, sub-units 110 are 1f, 2f, 8f, 12f, 24f or 48f. In an example, in each sub-unit 110 and the optical fibers 120 carried therein can be grouped in tubes 126 (see second close-up inset I2 in FIG. 2A). For example, for a 24f sub-unit 110, there can be two tubes 126 each carrying 12 optical fibers 120. The tubes 126 can be fed into a suitable connector, e.g., a single-fiber or multi-fiber connector, or furcated near its end to extract the number of optical fibers 120 needed for the particular connector(s) (e.g., 2×12f connectors). In an example illustrated in FIG. 2A, the sub-units 110 each includes external markings or indicia 113 that indicate the number of optical fibers 120 carried by each sub-unit and optionally can indicate properties of the sub-unit.

Figure 2B:
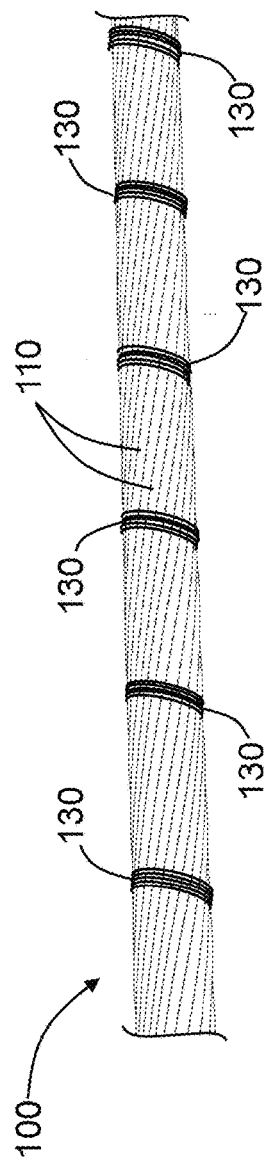
FIG. 2B is an elevated view of an example jacketless trunk cable illustrating an example wherein yarn is used to form the securing members, which are arranged at various points along the length of the cable to maintain the sub-units in their wound configuration.

In an example, the sub-units 110 are substantially maintained in their stranded configuration using one or more operably arranged securing members or binders 130. FIG. 2B shows an example of jacketless trunk 100 wherein the securing members 130 are formed from a textile fiber. In an example, the textile fiber includes a synthetic fiber such as aramid yarn or other polyester fiber.

Figure 3:
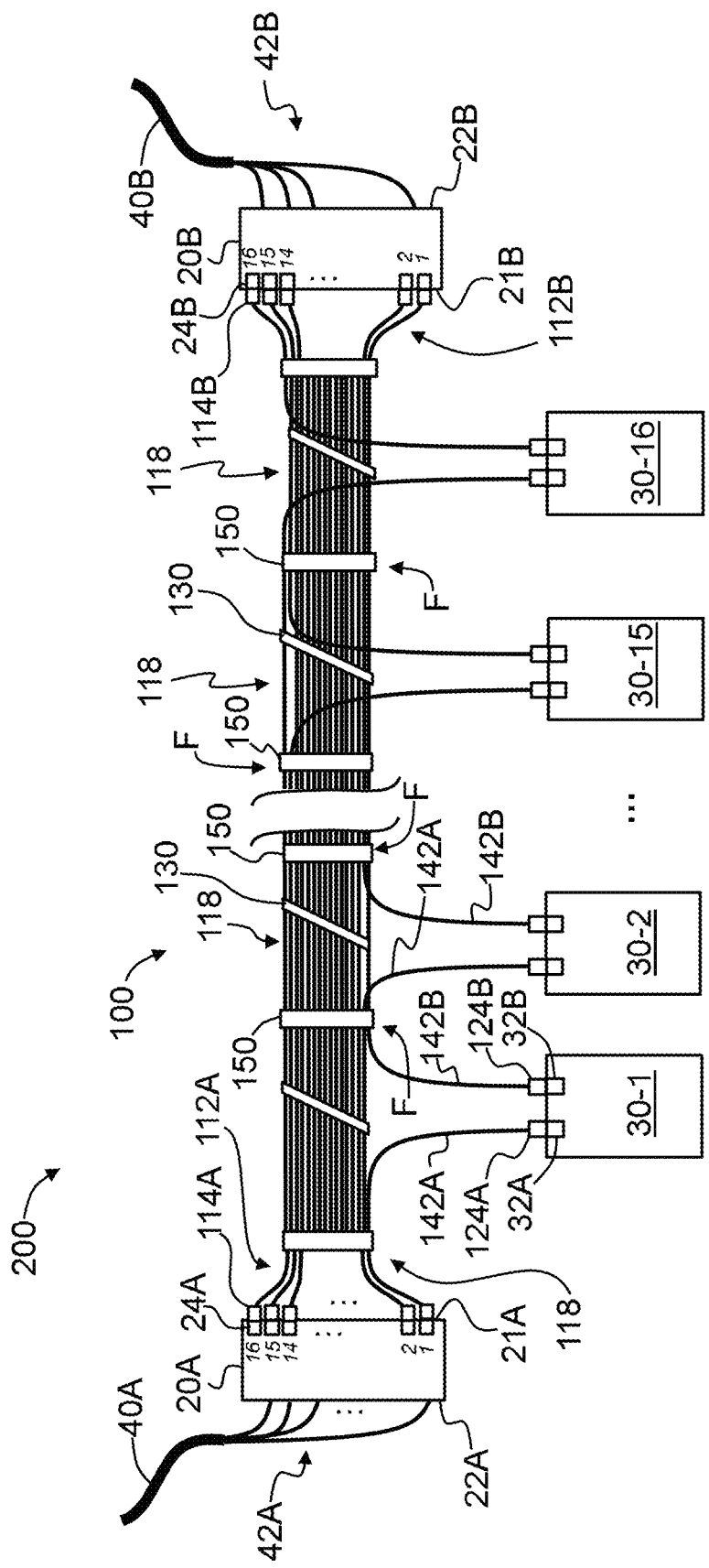
FIG. 3 is a schematic diagram of a first example bi-directional data center architecture according to the disclosure.

FIG. 3 is a schematic diagram of a first example data center architecture ("architecture") 200 according to the disclosure. The architecture 200 includes coupling panels 20A and 20B, sub-racks 30, conventional trunks 40A and 40B, and jacketless trunk 100. Coupling panels 20A and 20B have respective front sides 21A and respective backsides 22B. Conventional trunk 40A is operably connected to the backside 22A of coupling panel 20A while conventional trunk 40B is operably connected to the backside 22B of coupling panel 20B. Architecture 200 utilizes by way of example N=16 sub-racks 30, denoted 30-1, 30-2, . . . 30-15 and 30-16. The jacketless trunk 100 includes N=16 sub-units 110. In the architecture 200 of FIG. 3, the number N of sub-units 110 is the same as the number N of sub-racks, and the number N of (used) adapters 24A is the same as the number N of (used) adapters 24B.

Figure 4E:
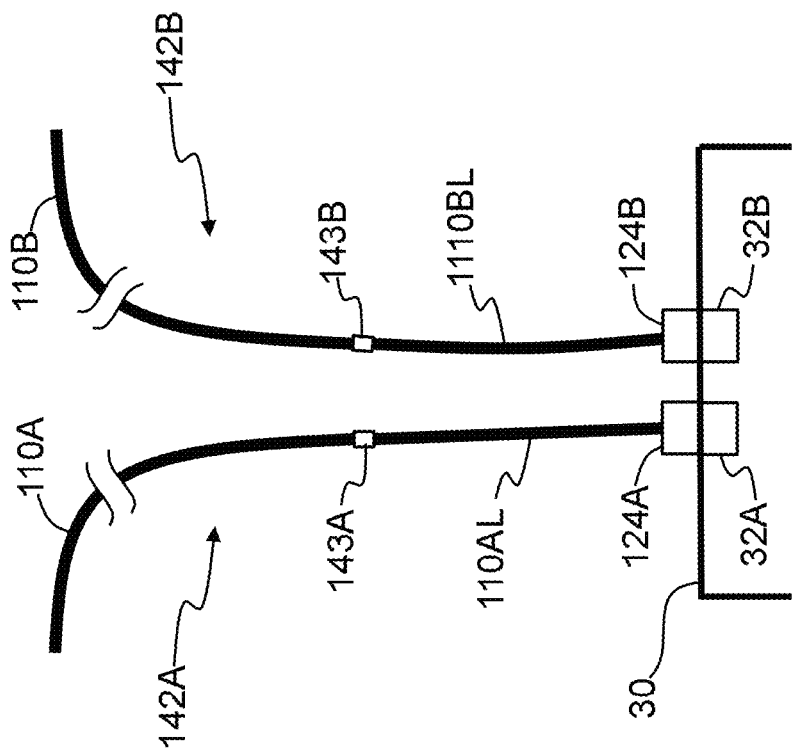
FIG. 4E is similar to FIG. 4D and illustrates an example embodiment wherein connectorized extensions are added to each of the sub-unit sections to extend the reach of each of the legs.
Figure 4D:
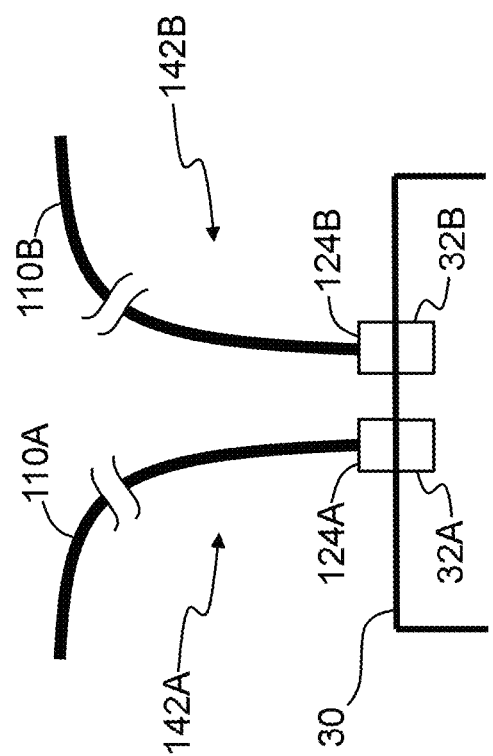
FIG. 4D illustrates how the connectorized sub-unit sections of FIG. 4C define respective legs that are used to connect to corresponding adapters of a sub-rack according to the architecture of FIG. 3.

The sub-units 110 of jacketless trunk 100 are used to establish the bi-directional optical connections between the coupling panels 20A, 20B and the sub-racks 30, thereby obviating the need for individual jumpers. As illustrated in FIGS. 4A through 4C, a portion of each sub-unit 110 is extracted from jacketless trunk 100 and is cut at a cut location 118 to form two sub-unit sections 110A and 110B with respective cut ends 122A and 122B. The cut ends 122A and 122B are respectively connectorized with connectors 124A and 124B suitable for the number of fibers 120 carried in each sub-unit 110. The end portions of the two connectorized sub-unit sections 110A and 110B serve to define respective legs 142A and 142B. As illustrated in FIG. 4D, legs 142A and 142B are led from the bundled portion of the jacketless trunk 100 to the corresponding sub-rack 30. The connector 124A of leg 142A is then connected to adapter 32A while connector 124B of leg 142B is connected to adapter 32B of the same sub-rack 30.

With reference again to FIG. 3, the N adapters 24A in coupling panel 20A and the N adapters 24B in coupling panel 20B are each numbered 1 through 16. The sub-unit 110 that initially connects adapter 24A-1 directly to adapter 24B-1 is cut at cut location 118 at a convenient location and the resulting sub-unit ends 122A and 122B are connectorized as described above. The connectorized ends 124A and 124B are then connected to adapters 32A and 32B of sub-rack 30-1, i.e., the legs 142A and 142B formed from cutting sub-unit 110 are each led to and then connected to the same sub-rack 30.

In an example, the furcation and connectorization steps can be carried out in the field or can be done before deployment of the jacketless trunk 100 if the distances between coupling panels 20A, 20B and sub-racks 30 are known beforehand. In an example, an additional securing member 130, such as a section of shrink wrap 150, is applied at a location on jacketless trunk between (e.g., mid-way between) cut locations 118 to help secure legs 142A and 142B. In the discussion below, the additional securing members 130 added to jacketless trunk 100 as part of the furcation process are referred to below as "shrink wrap" 150, to distinguish from the existing securing members 130 used at the outset to keep the jacketless trunk in its wound configuration.

The reach of legs 142A and 142B is limited. Consequently, in some cases it may be necessary to extend the reach of one or both of the legs 142A and 142B. FIG. 4E is similar to FIG. 4D and shows an example where extra sub-unit lengths or extensions 110AL and 110BL are added (e.g., via respective splices 143A and 143B) to respective cut ends 122A and 122B of sub-unit sections 110A and 110B. In an example, the extensions 110AL and 110BL comprise pigtails having sufficient lengths to conveniently reach the corresponding sub-rack adapters 32A and 32B of the corresponding sub-rack 30. In an example, only one of legs 142A and 142B may need to be extended in this manner.

Figure 5:
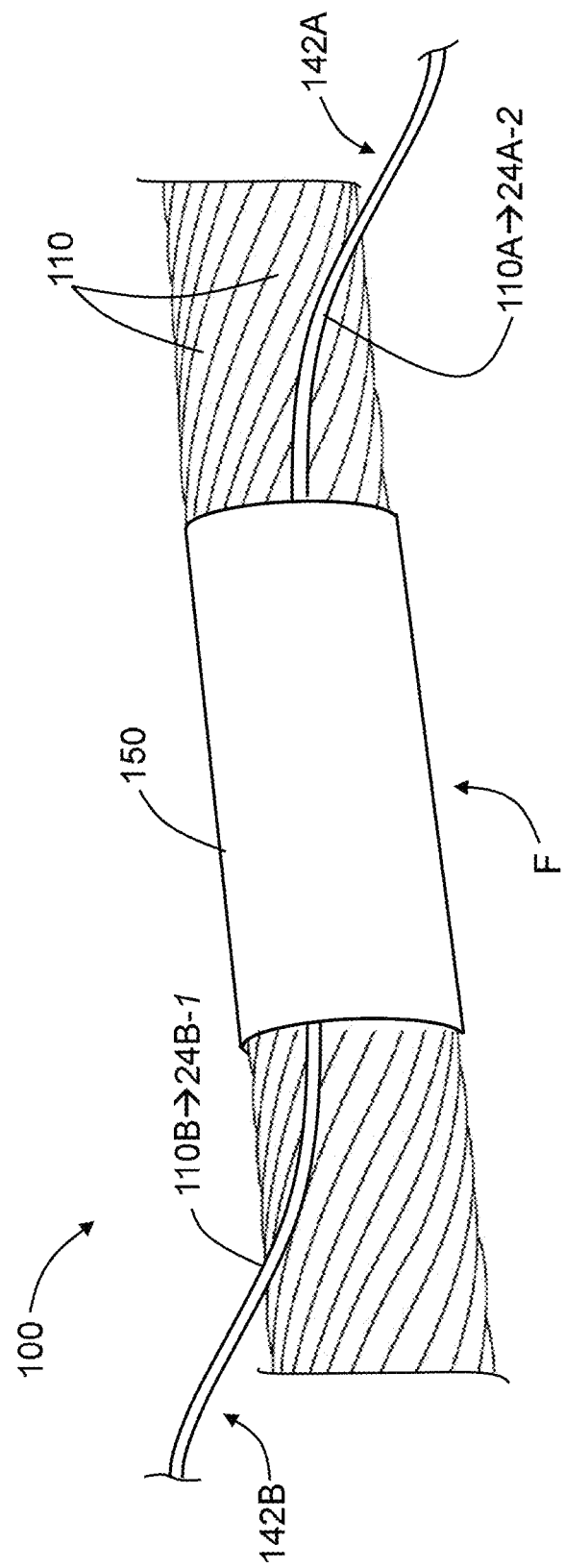
FIG. 5 is an elevated close-up view of the jacketless trunk cable showing the use of a section of shrink wrap at a furcation point to secure the two legs to the other sub-units at the furcation point.

FIG. 5 is a schematic diagram of jacketless trunk 110 that illustrates an example embodiment wherein shrink wrap 150 is applied to the jacketless trunk 110 between cut locations 118 to help secure legs 142A and 142B to the other sub-units 110. With reference also to FIG. 3, note that the location of leftmost shrink wrap 150, the legs 142A and 142B extending therefrom lead to different sub-units 30-2 and 30-1, respectively. The location of shrink wrap 150 thus defines a furcation point F along the length of jacketless trunk 110.

An advantage of the example architecture 200 of FIG. 3 is that the entire length of each optical fiber 120 can be fully used; there are no wasted optical fibers, extra lengths of optical fibers not being used, etc., and there is no need for having a collection of jumpers to make the connections between the coupling panels 20 and the sub-racks 30.

An example method of establishing the optical connections between the coupling panels 20A, 20B and sub-racks 30 using jacketless trunk 100 is as follows.

First, jacketless trunk cable 100 is provided and the individual sub-units are separated at ends 102A and 102B. The ends 112A and 112B of the sub-units 110 are then connectorized with connectors 114A and 114B respectively. One example connectorization includes directly connectorizing each sub-unit end 112A and 112B with respective connectors 114A and 124B suitable for the number of optical fibers 120 carried by the sub-units 110, e.g., a single-fiber connector if the sub-units each carry a single optical fiber, or a multi-fiber connector (e.g., MPO) if the sub-units carry multiple optical fibers. In another example, a mini-furcation is made at the sub-unit ends 112A and 112B to use multiple connectors 114A and multiple connectors 114B. For example, if a given sub-unit 110 carries 24 optical fibers 120 (i.e., is a 24f sub-unit), then two 12f MPO connectors (i.e., 2×12f) 114A can be used to connectorize the sub-unit ends 112A of the 24f sub-unit, and two 12 MPO connectors 114B can be used to connectorize the sub-unit ends 112B. Or in another example of a 48f sub-unit 110, four 12f MPO connectors (4×12) 114A can be used to connectorize the sub-unit ends 112A of the 48f sub-unit while four 12f MPO connectors (4×12) 114B can be used to connectorize the sub-unit ends 112B.

An example method of preparing legs 142A and 142B is as follows. First, identify the sub-unit 110 for the given connection, e.g., the sub-unit for connecting to the first sub-rack 30-1. Next, extract a portion of the sub-unit 110 and cut the sub-unit at a cut location 118 that is a desired distance from an end 102A or 102B of jacketless trunk 100. Next, pull the resulting cut ends 122A and 122B to extract a desired length for each of the resulting sub-unit sections 110A and 110B to define legs 142A and 142B.

Next, add heat shrink tubing 150 to jacketless trunk 100 between (e.g., mid-way between) cut locations 118 to prevent damage to the sub-unit sections 110A and 110B (see FIG. 5) while generally securing the bundled sub-units 110. As noted above, the locations of heat shrink tubing 150 define furcation points F from which legs 142 extend and connect to sub-racks 30.

Next, connectorize the ends 122A and 122B of the sub-unit sections 110A and 110B with the desired type of connectors 124A and 124B as described above. Once the connectorization is formed, the resulting legs 142A and 142B are then connected to the corresponding adapters 32A and 32B of corresponding sub-rack 30. The process is repeated for the other sub-racks 30 until all of the sub-racks are optically connected to the coupling panels 20A and 20B according to the architecture 200 of FIG. 3.

Figure 6:
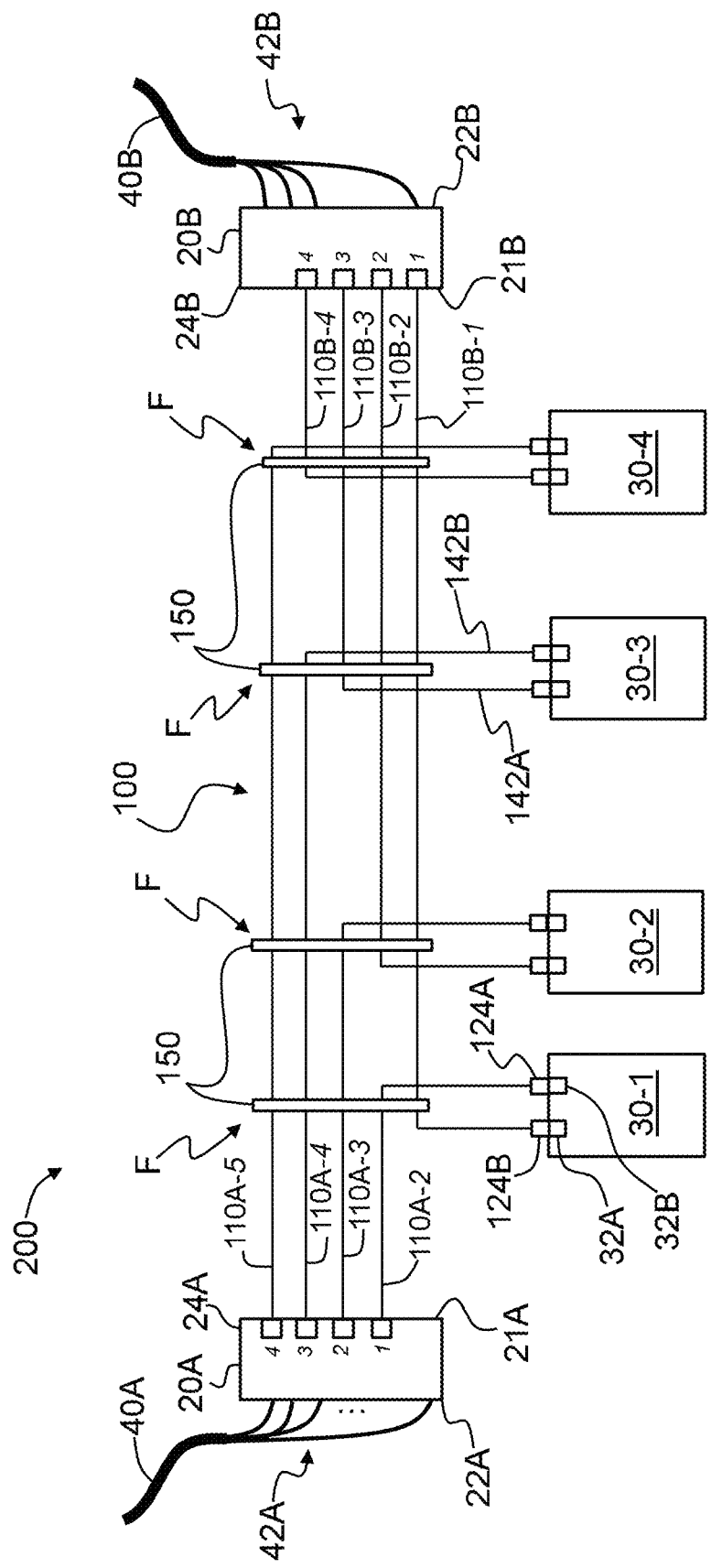
FIG. 6 is a schematic diagram of a second example bi-directional data center architecture according to the disclosure.

FIG. 6 is a schematic diagram of a second example architecture 200 that employs jacketless trunk 100. The example architecture of FIG. 6 is similar to that of FIG. 3, but connects each sub-rack 30 to the same corresponding connections on coupling panels 20A and 20B. The difference from the first example architecture is that the connecting fibers 120 are taken from two different subunits 110. The example architecture 200 of FIG. 6 shows four active connection locations (adapters 24A) 1 through 4 for coupling panel 20A and four active connection locations (adapters 24B) 1 through 4 for coupling panel 20B. Also, there are four sub-racks 30-1 through 30-4 and a total of five sub-units 110 (110-1 through 110-5).

Note that in FIG. 3, adapter 24A-1 is connected to adapter 32A of sub-rack 30-1 while adapter 24B-1 is connected to adapter 32B of sub-rack 30-1. Thus, the two sections 110A and 110B formed by furcating sub-unit 110 connect to a different sub-unit 30.

In the architecture 200 of FIG. 6, adapter 24A-2 is connected to adapter 32B of sub-unit 30-1 while adapter 24B-1 is connected to adapter 32A of sub-unit 30-1. Table 1 below summarizes the connections made by jacketless trunk 100 in the example architecture of FIG. 6 for the different sub-racks 30. In Table 1 below, the adapter connections for adapters 24A-1 through 24A-4 at coupling panel 20A are abbreviated A1 through A4, and the adapter connections for adapters 24B-1 through 24A-4 at coupling panel 20B are abbreviated B1 through B4. A sub-unit 110 with an "A" suffix (e.g., "110A-2") originates from coupling panel 20A while a sub-unit with a suffix "B" (e.g., "110B-1") originates from coupling panel 20B. The italicized number in the suffix indicates the adapter number in the coupling panel.

TABLE 1

| Sub-Rack Connections | | |
|---|---|---|
| Sub-Rack | Connection | Sub-Unit |
| 30-1 | 32A | B1 | 110B-1 |
|  | 32B | A1 | 110A-2 |
| 30-2 | 32A | B2 | 110B-2 |
|  | 32B | A2 | 110A-3 |
| 30-3 | 32A | B3 | 110B-3 |
|  | 32B | A3 | 110A-4 |
| 30-4 | 32A | B4 | 110B-4 |
|  | 32B | A4 | 110A-5 |

The example architecture 200 of FIG. 6 does not require adding extensions to cables 110A or 110B. Note that two of the sub-units 110, namely 110A-4 and 110B-1 do not require cutting a sub-unit into two sections, i.e., these particular sub-units are run straight to their respective connections; specifically, the entirety of cable 110A-4 connects adapter 24A-5 to adapter 32B of sub-rack 30-4, while the entirety of cable 110B-1 connects adapter 24B-1 to adapter 32A of sub-rack 30-1.

The jacketless trunk 100 requires one additional sub-unit 110 to accommodate the alternating connections as set forth in Table 1 above. In the present example, since there are four sub-racks 30, jacketless trunk 100 requires five sub-units 110. Thus, for the architecture 200 of FIG. 6, jacketless trunk 100 requires (N+1) sub-units 110 where N is the number of sub-racks 30. Furthermore, the peripheral sub-units 110B-1 and 110A-5 are respectively connected to a single sub-rack (namely, sub-rack 30-1 and sub-rack 30-4, respectively). That is to say, these two peripheral sub-units 110 are not cut to form two sections 110A and 100B; instead, each consists of a single section that connects a peripheral adapter on the respective sub-panel 20 to the corresponding sub-rack 30.

In an example, the two peripheral sub-units 110 are optically connected to the most distant sub-rack 30 as measured with respect to the sub-panel 20 to which the peripheral sub-unit is connected at one of its two ends. In addition, the sub-panel adapter 24A or 24B to which the peripheral sub-unit 110 is optically connected is a "peripheral adapter," i.e., it resides one end of the coupling panel.

For example, as shown in FIG. 6, the peripheral sub-unit 110B-1 is connected to adapter 24B-1 of sub-panel 20B and is also connected to the adapter 32B of sub-rack 30-1. Adapter 24B-1 is a peripheral adapter of sub-panel 20B, while sub-rack 30-1 is the most distant sub-rack from sub-panel 20B. Likewise, the peripheral sub-unit 110A-5 is connected to adapter 24A-4 of sub-panel 20A and is also connected to the adapter 32B of sub-rack 30-4. Adapter 24A-4 is a peripheral adapter of sub-panel 20A, while sub-rack 30-4 is the most distant sub-rack from sub-panel 20A.

There are two such peripheral sub-units 110 in the architecture 200 of FIG. 6, namely 110A-5 and 110B-5, as noted above. Thus, for the (N+1) total sub-units 110, a total of (N−1) of the sub-units are divided up into sub-unit sections 110A and 110B while two of the sub-units remain undivided (i.e., each consists of a single section) and form direct connections between the given sub-panel 20 and the given. The two uncut sub-units 110 are referred to as being peripheral because they reside at the "edges" (or the top and bottom) of the architecture 200 in the schematic diagram of FIG. 6.

In an example, shrink wrap 150 can be advantageously located directly over the particular sub-rack 30, with the legs 142A and 142B coming from a given furcation point F and connecting to the same sub-rack 30. Note that the legs 110A and 110B connected to a given sub-rack 30 are not formed from the same sub-unit 110. The maximum length of a given leg is equal to half of the distance between adjacent sub-racks 30, but when to the furcation location 118 directly above the sub-rack, leg splicing can usually be avoided.

Figure 7:
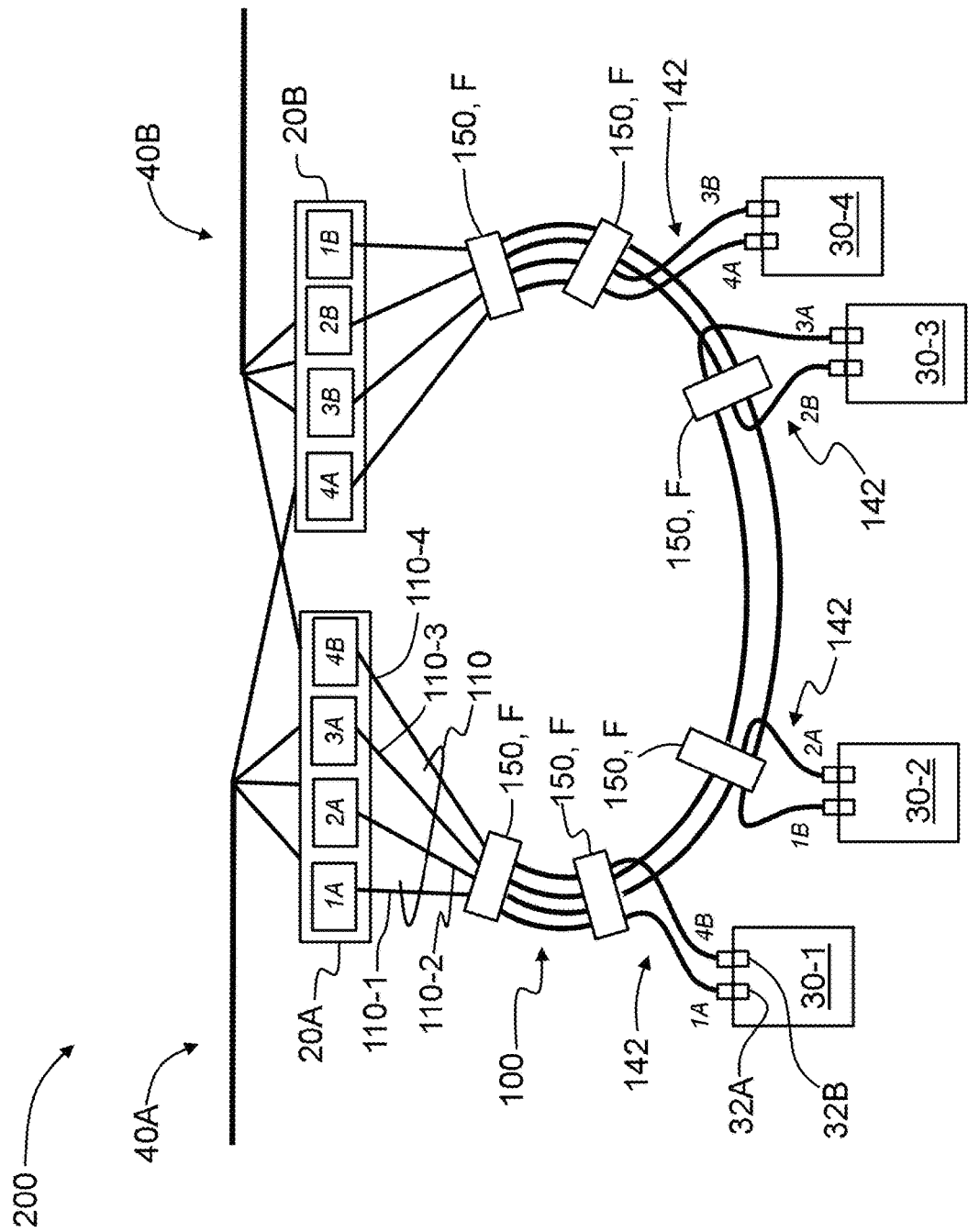
FIG. 7 is a schematic diagram of a third example bi-directional data center architecture according to the disclosure.

FIG. 7 is a schematic diagram of a third example architecture 200 where the coupling panels 20A and 20B include a "flip," wherein coupling panel 20A includes adapter 24B-4 (denoted "4B") rather than the usual adapter 24A-4, and coupling panel 20B includes adapter 24A-4 (denoted "4A") rather than the usual adapter 24B-4. Adapter 24B-4 in coupling panel 20A is fed by a corresponding leg of trunk cable 40B, while adapter 24A-4 in coupling panel 20B is fed by a corresponding leg of trunk cable 40. This configuration is facilitated when coupling panels 20A and 20B are in relatively close proximity.

The legs 142 are shown extending from four different furcation points F along jacketless cable 100, with the legs operably connecting to four different sub-racks 30-1 through 30-4. The legs 142 that connect to the adapters 32A and 32B of given sub-rack 30 are from different sub-units 110.

The example architecture 200 of FIG. 7 includes four sub-racks 30 and jacketless trunk 100 includes four sub-units 110, denoted 110-1 through 110-4 by way of non-limiting example and for ease of explanation. Other numbers of sub-racks 30 and sub-units 110 can be used to form the example architecture 200 of FIG. 7.

The architectures 200 disclosed herein provide a number of advantages. A first advantage is that jacketless trunk 100 includes bundled (e.g., wound) sub-units 100, which makes the jacketless trunk compact and easy to deploy. Further, connection time is reduced because the installers of architecture 200 need only install one jacketless trunk cable 100 instead of two sets of individual jumpers between coupling panels 20A and 20B and sub-racks 30.

Further, the design of jacketless trunk 100 considerably limits the cable dimensions in comparison to individual jumpers and thus provides for more efficient and easier cable management inside cable trays. In particular, the jacketless trunk occupies less tray space, which results in better air circulation, which in turn reduces energy costs. The jacketless trunk 100 is also considerably less expensive than a jacketed cable and allows ready access to the sub-units 110 therein.

The connection of the coupling panels 20A and 20B at respective ends 102A and 102B of jacketless trunk 100 eliminates the problem of unused optical fibers. Every optical fiber 120 in each sub-unit 110 is used to establish an optical connection in each of the example architectures 200, i.e., there are no optical fibers that go unused. An architecture wherein some of the optical fibers are unused is inefficient, costly and wastes space in the data center.

The design of jacketless trunk 100 allows very easy connectorization and furcation process. As opposed to conventional trunks, the jacketless trunk does not require epoxy-filled furcation plugs, which adds to system cost and complexity. The individual sub-units 110, once extracted from the bundled sub-units, are ready for direct connectorization or splicing. This translates directly to cost effectiveness of this solution.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A bi-directional data center architecture, comprising:
first and second coupling panels respectively having N first adapters and N second adapters;
a plurality of N sub-racks; and
a jacketless trunk cable that includes:
N first sub-unit sections each extending from a respective one of the N first adapters of the first coupling panel; and
N second sub-unit sections each extending from a respective one of the N second adapters of the second coupling panel;
wherein:
each of the N first sub-unit sections and each of the N second sub-unit sections carries an even number of optical fibers and are terminated with a multi-fiber connector that accommodates the same number of optical fibers carried by each of the N first sub-unit sections and each of the N second sub-unit sections;
the N first sub-unit sections each optically connect the corresponding first adapter of the first coupling panel to a different one of the N sub-racks;
the N second sub-unit sections each optically connect the corresponding second adapter of the second coupling panel to a different one of the N sub-racks; and
wherein every one of the one or more optical fibers in the N first sub-unit sections and the N second sub-unit sections is used to establish an optical connection.

2. The bi-directional data center architecture according to claim 1, wherein one of the N first sub-unit sections is a first peripheral sub-unit section that connects one of the N first adapters to a most distant one of the N sub-racks as measured from the first coupling panel.

3. The bi-directional data center architecture according to claim 2, wherein one of the N second sub-unit sections is a second peripheral sub-unit section that connects one of the N second adapters to a most distant one of the N sub-racks as measured from the second coupling panel.

4. The bi-directional data center architecture according to claim 1, wherein each of the N first sub-unit sections and each of the N second sub-unit sections have a length and a wound configuration, and wherein a plurality of securing members are arranged along the jacketless trunk cable to maintain the wound configuration.

5. The bi-directional data center architecture according to claim 1, wherein the jacketless trunk cable includes furcation points, and wherein the jacketless trunk cable includes heat-shrink securing members at the furcation points.

6. The bi-directional data center architecture according to claim 5, wherein the furcation points are located at the sub-racks, and wherein the first and second sub-unit sections optically connected to a given sub-rack extend from the same furcation point.

7. The bi-directional data center architecture according to claim 1, wherein the jacketless trunk cable includes furcation points located at the sub-racks, and wherein the first and second sub-unit sections optically connected to a given sub-rack extend from the same furcation point.

8. A method of forming a bi-directional data center architecture that includes first and second coupling panels and a plurality of N sub-racks, wherein the first and second coupling panels respectively have N first and second adapters, the method comprising:
providing a jacketless trunk cable that includes opposed first and second ends, N first sub-unit sections associated with the first end, and N second sub-unit sections associated with the second end, wherein each of the N first sub-unit sections and each of the N second sub-unit sections carries an even number of optical fibers and are terminated with a multi-fiber connector that accommodates the same number of optical fibers carried by each of the N first sub-unit sections and each of the N second sub-unit sections;
optically connecting the first adapters of the first coupling panel to different sub-racks of the plurality of N sub-racks using the respective ones of the first sub-unit sections; and
optically connecting the second adapters of the second coupling panel to different sub-racks of the plurality of N sub-racks using the respective ones of the second sub-unit sections;
wherein every one of the one or more optical fibers in the N first sub-unit sections and the N second sub-unit sections is used to establish an optical connection.

9. The method according to claim 8, wherein optically connecting the first adapters of the first coupling panel to different sub-racks comprises:
optically connecting a first peripheral sub-unit section of the N first sub-unit sections to one of the N first adapters and to a most distant one of the sub-racks as measured from the first coupling panel.

10. The method according to claim 9, wherein optically connecting the second adapters of the second coupling panel to different sub-racks comprises:
optically connecting a second peripheral sub-unit section of the N second sub-unit sections to one of the N second adapters and to a most distant one of the sub-racks as measured from the second coupling panel.

11. The method according to claim 8, further comprising furcating the jacketless trunk cable at furcation locations located at the sub-racks;
extending one of the N first sub-unit sections and one of the N second sub-unit sections from a given one of the furcation locations to the sub-rack associated with the given one of the furcation locations.

12. The method according to claim 11, wherein furcating the jacketless trunk cable includes adding respective shrink wrap securing members to the respective furcation locations.

13. The method according to claim 8, wherein each of the N first sub-unit sections and each of the N second sub-unit sections have a length and a wound configuration, the method further comprising:
arranging securing members along a length of the jacketless trunk cable to maintain the wound configuration.

14. A jacketless trunk cable for a bi-directional data center architecture involving N sub-racks and first and second coupling panels that respectively have N first adapters and N second adapters, the jacketless trunk cable comprising:
opposed first and second ends for coupling to the respective first and second coupling panels;
N first sub-unit sections associated with the first end; and
N second sub-unit sections associated with the second end;
wherein:
each of the N first sub-unit sections has a different length for extending from a respective one of the first adapters of the first coupling panel to a respective one of the N sub-racks;
each of the N second sub-unit sections has a different length for extending from a respective one of the second adapters of the second coupling panel to a respective one of the N sub-racks;
each of the N first sub-unit sections and each of the N second sub-unit sections carries an even number of optical fibers and are terminated with a multi-fiber connector that accommodates the same number of optical fibers carried by each of the N first sub-unit sections and each of the N second sub-unit sections.

15. The jacketless trunk cable according to claim 14, wherein each of the N first sub-unit sections and each of the N second sub-unit sections have a length and a wound configuration, and wherein a plurality of securing members are arranged along the jacketless trunk cable to maintain the wound configuration.

16. The bi-directional data center architecture according to claim 14, wherein the jacketless trunk cable includes furcation points, and wherein only one of the N first sub-unit sections and only one of the N second sub-unit sections are configured to extend from a given one of the furcation locations to an associated one of the sub-racks.

* * * * *